United States Patent
Aizawa et al.

(10) Patent No.: US 7,638,967 B2
(45) Date of Patent: Dec. 29, 2009

(54) MOTOR CONTROL UNIT (75) Inventors: Toshimitsu Aizawa, Kawasaki (JP); Tsuyoshi Hosoito, Seto (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 354 days.

(21) Appl. No.: 11/819,640

(22) Filed: Jun. 28, 2007

(65) Prior Publication Data
US 2008/0042613 A1 Feb. 21, 2008

(30) Foreign Application Priority Data
Jun. 28, 2006 (JP) ............................. 2006-178323

(51) Int. Cl.
*H02P 6/16* (2006.01)
*H02P 21/00* (2006.01)
(52) U.S. Cl. .................. 318/778; 318/431; 318/400.02; 318/720; 318/779
(58) Field of Classification Search ............ 318/400.02, 318/778, 779, 430, 431, 461, 720, 701, 799
See application file for complete search history.

(56) References Cited

U.S. PATENT DOCUMENTS

| 7,017,377 | B2* | 3/2006 | Hosoito et al. | 68/12.16 |
| 7,478,547 | B2* | 1/2009 | Okazaki et al. | 68/12.04 |
| 2002/0189301 | A1* | 12/2002 | Hosoito et al. | 68/12.02 |
| 2003/0154041 | A1* | 8/2003 | McGaughey et al. | 702/75 |
| 2004/0061472 | A1* | 4/2004 | Won et al. | 318/701 |
| 2005/0160771 | A1* | 7/2005 | Hosoito et al. | 68/12.16 |
| 2006/0207299 | A1* | 9/2006 | Okazaki et al. | 68/12.02 |
| 2007/0159130 | A1* | 7/2007 | Kaneko et al. | 318/806 |
| 2008/0297099 | A1* | 12/2008 | Maekawa | 318/799 |
| 2008/0315816 | A1* | 12/2008 | Hashimoto | 318/461 |
| 2009/0026999 | A1* | 1/2009 | Atarashi | 318/720 |

(Continued)

FOREIGN PATENT DOCUMENTS

JP 2003-319698 11/2003

(Continued)

OTHER PUBLICATIONS

Notification of Reasons for Refusal dated Aug. 29, 2008 for Application No. 10-2007-0022747.

(Continued)

*Primary Examiner*—Paul Ip
(74) *Attorney, Agent, or Firm*—Pillsbury Winthrop Shaw Pittman, LLP (57) ABSTRACT

A motor control unit includes a power converter unit that energize a motor based on a commutating signal, the motor having a rotor provided with a permanent magnet and a stator having a coil wound thereto; a start-up controller that outputs a commutating signal to the power converter unit during a start-up operation, the commutating signal having a predetermined conductive pattern corresponding to a command rotational speed; a voltage calculator that calculates a voltage of the motor during the start-up operation by applying a parameter for the motor, the command rotational speed, and a current flown in the coil of the motor to a voltage-current equation of the motor; and a determiner that, during the start-up operation, compares a voltage calculated by the voltage calculator and an actual voltage of the motor and that determines occurrence of rotational abnormalities when the actual voltage is lower than the calculated voltage.

16 Claims, 4 Drawing Sheets

U.S. PATENT DOCUMENTS

2009/0039808 A1* 2/2009 Hashimoto ............. 318/400.02

FOREIGN PATENT DOCUMENTS

| JP | 2006-087154 | 3/2006 |
| JP | 2006-136064 | 5/2006 |
| KR | 2003-0027840 A | 4/2003 |
| KR | 2005-0104366 A | 11/2005 |

OTHER PUBLICATIONS

Chinese Office Action dated Jan. 16, 2009 for Appln. No. 2007100858741.

Mingjun, Yi et al. "Design and Verification of a High Saliency ALA Rotor Motor"; Huazhong University of Science & Technology, Wuhan 730074; Dec. 31, 2007; pp. 15-17.

* cited by examiner

MOTOR CONTROL UNIT

This application is based upon and claims the benefit of priority from the prior Japanese Patent Application 2006-178323, filed on, Jun. 28, 2006 the entire contents of which are incorporated herein by reference.

FIELD

The present disclosure is directed to a motor control unit that executes the so called sensor-less control of a motor provided with a permanent magnet in its rotor.

BACKGROUND

There has been a demand for wide-ranged variable speed control, reduction in electricity consumption, and improved maintainability in the field of compressor motors and fan motors in applications such as air conditioners, and in the field of drive motors for electric automobiles. To meet such demands, a sensor-less drive method is being used in a number of applications. The sensor-less drive method executes field-oriented control of a permanent magnet motor having a permanent magnet in its rotor with an inverter unit without providing a sensor such as hall IC for rotor positioning detection purposes.

For instance, fan motors used in exterior units of air conditioners experience abnormal rotation in which the motor becomes locked unrotatably by external force or by its own problems, and in some instances experience significant reduction in rotational speed by step-out, or by other reasons. A sensor-less drive method that does not employ a sensor for detecting rotor positioning is not capable of directly detecting such abnormalities in rotation. In the light of the above, in JP 2003-319698 A, angular frequency of the rotor is detected by converging the d-axis induced voltage estimate to zero when executing a position estimate operation to determine the occurrence of abnormal rotation based on the difference between the detected angular frequency and the angular frequency command value.

The above described patent document discloses means for determining rotational abnormalities during the position estimation operation. However, when starting the motor, forcible commutation by way of a conductive signal having a constant pattern is required until induced voltage reaches a substantial magnitude to allow position detection of the rotor. Since forcible commutation does not provide rotational position feedback, rotational abnormalities such as step-out is prone to occur, and such rotational abnormalities also introduces problems such as noise generation.

SUMMARY

An object of the present disclosure is to provide a motor control unit that allows prompt detection of rotational abnormalities during a sensor-less drive including a start-up operation involving forcible commutation.

In one aspect of the present disclosure, a motor control unit includes a power converter unit that energize a motor based on a commutating signal, the motor having a rotor provided with a permanent magnet and a stator having a coil wound thereto; a start-up controller that outputs a commutating signal to the power converter unit during a start-up operation, the commutating signal having a predetermined conductive pattern corresponding to a command rotational speed; a voltage calculator that calculates a voltage of the motor during the start-up operation by applying a parameter for the motor, the command rotational speed, and a current flown in the coil of the motor to a voltage-current equation of the motor; and a determiner that, during the start-up operation, compares a voltage calculated by the voltage calculator and an actual voltage of the motor and that determines occurrence of rotational abnormalities when the actual voltage is lower than the calculated voltage.

In another aspect of the present disclosure, a motor control unit includes a power converter unit that energize a motor based on a commutating signal, the motor having a rotor provided with a permanent magnet and a stator having a coil wound thereto; an estimator that estimates a rotational speed and a rotational position of the rotor; a drive controller that outputs a commutating signal to the power converter unit during a position estimating operation based on a rotational position estimated by the estimator; a voltage calculator that calculates a voltage of the motor during the position estimating operation by applying a parameter for the motor, a rotational speed estimated by the estimator, and a current flown in the coil of the motor to a voltage-current equation of the motor; and a determiner that, during the position estimating operation, compares a voltage calculated by the voltage calculator and an actual voltage of the motor and that determines occurrence of rotational abnormalities when the actual voltage is lower than the calculated voltage.

When the motor is in rotation, since reactance of the coils is increased, voltage of the motor is increased in proportion to the increase in command rotational speed of the motor. As opposed to this, when the motor is stopped or decelerated below the command rotational speed, the reactance of the coils is reduced and the voltage of the motor stays low even if the command rotational speed is increased. Thus, during a sensor-less drive involving start-up, occurrence of rotational abnormalities during the start-up operation or the position estimating operation can be determined promptly by comparing the voltage calculated based on the voltage-current equation and the actual voltage of the motor.

BRIEF DESCRIPTION OF THE DRAWINGS

Other objects, features and advantages of the present disclosure will become clear upon reviewing the following description of the embodiments with reference to the accompanying drawings, in which, FIG. 1 (1A and 1B) is a block diagram of an electrical configuration of an inverter unit when executing a position estimating operation and indicates a first embodiment of the present disclosure.

DETAILED DESCRIPTION

One embodiment of the present disclosure will be described hereinafter with reference to the drawings.

Figure 1A:
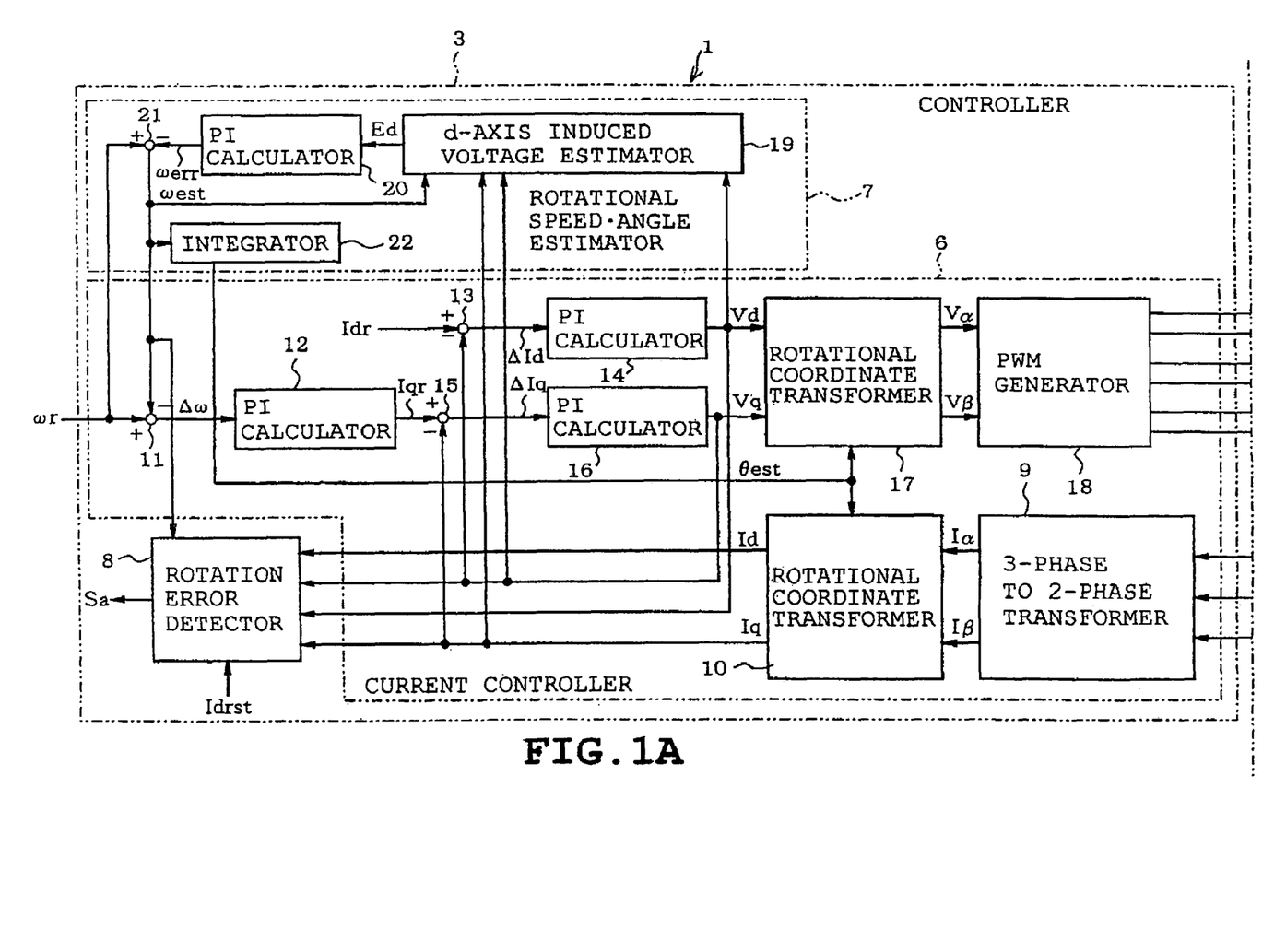
Figure 1B:
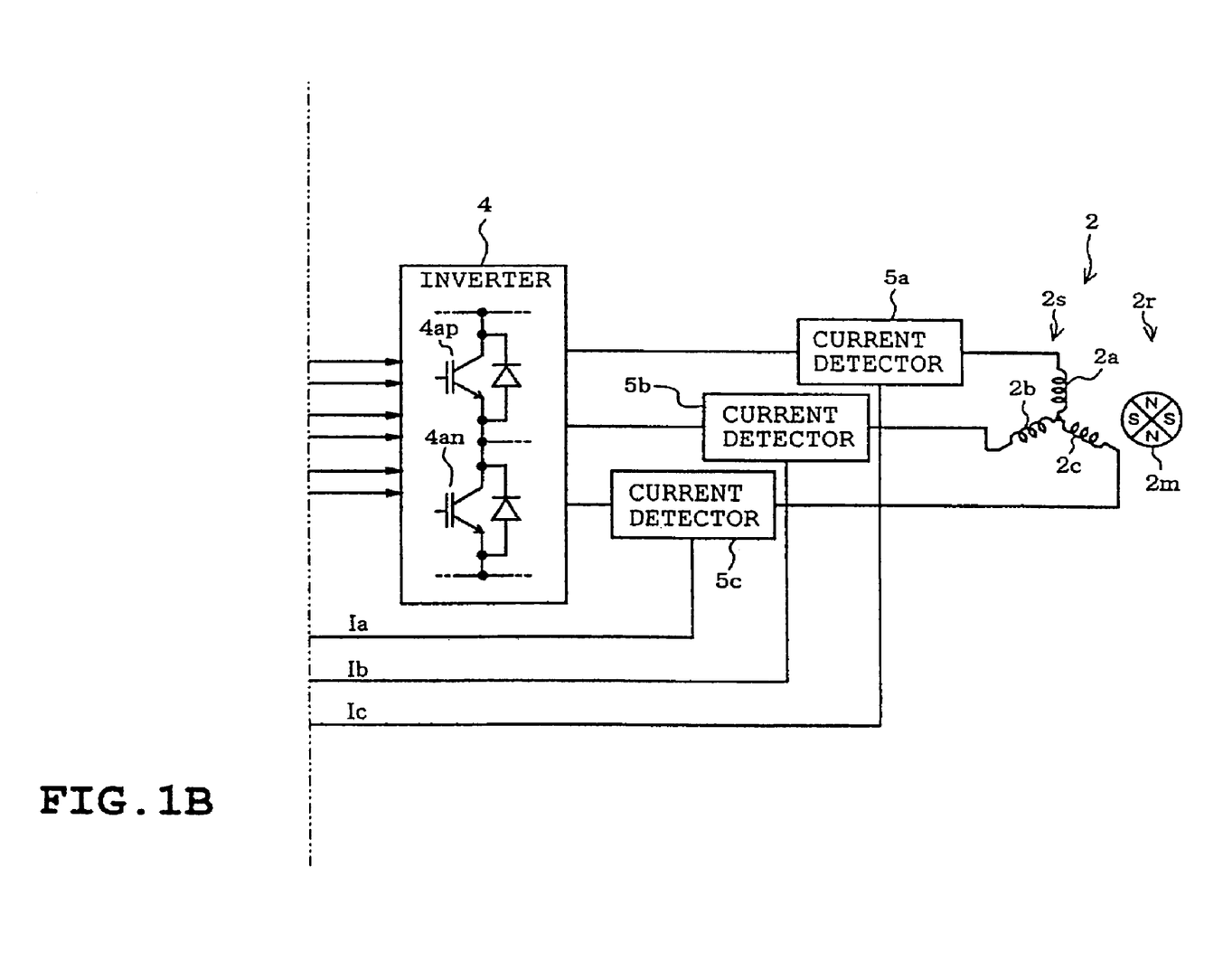

FIG. 1 is a functional block diagram illustrating the configuration of a motor control unit executing a position estimation operation. A motor 2 (rotary machine) controlled by the motor control unit 1 is a three-phase permanent magnet synchronous motor (PM motor) having a rotor 2r provided with a permanent magnet 2m, and a stator 2s having armature coils 2a, 2b, and 2c wound thereto. No sensor is provided that directly detects the position of the rotor 2r. The motor control unit 1 controls the drive of the motor 2 by the so called sensor-less field-oriented control.

The motor control unit 1 includes a controller 3, an inverter 4, and current detectors 5a, 5b, and 5c. The inverter 4 constituting a power converter unit is a well-known voltage type inverter having switching elements such as IGBT 4ap, 4an . . . to a 3-phase bridge configuration. The current detectors 5a, 5b, and 5c constituted by hall CT, shunt resistor, and the like, are provided between an output terminal of the inverter 4 and the terminal of the motor 2.

The controller 3 is configured by a processor provided with basic components such as CPU core and memory; and peripheral circuits such as an A/D converter, a timer, an input/output port, and communication interface. The controller 3 controls the motor 2 by executing a control program stored in a non-volatile memory such as flash memory. The controller 3 defines the magnetic flux axis as a d-axis and the torque axis perpendicular thereto as a q-axis, and executes field-oriented control by controlling voltage and current by the dq coordinate system.

The controller 3 implements functionalities of a current controller 6, a rotational speed/rotational angle estimator 7, and rotational abnormality detector 8. The rotational speed/rotational angle estimator 7 estimates a rotational speed ω and magnetic pole position (rotational phase angle θ) of the rotor 2r. Whereas, when executing a position estimating operation, the current controller 6 operates as a drive controller that operates as a drive controller that controls the phase and amount of current to be flown in the coils 2a, 2b, and 2c based on the estimated rotational position. When executing the start-up operation and position estimating operation, the rotational abnormality detector 8 detects locking of the rotor 2r or abnormal reduction in rotational speed.

A three-phase to two-phase transformer 9 of the current controller 6 transforms three-phase currents Ia, Ib, and Ic detected by current detectors 5a, 5b, and 5c into a two-phase current Iα and Iβ equivalent thereto. Also, a rotational current converter 10 converts currents Iα and Iβ of the αβ coordinate system into currents Id and Iq of the dq coordinate system. A rotor angle θest estimated by the later described rotational speed/rotational angle estimator 7 is used in the calculation of rotational coordinate transformation.

A command rotational speed ωr is inputted to the controller 3. A subtractor 11 subtracts a rotational speed ωest estimated by the rotational speed/rotational angle estimator 7 from the command rotational speed ωr to obtain a speed error Δω. A PI calculator 12 generates a command q-axis current Iqr by executing PI calculation on speed error Δω. The command d-axis current Idr takes a constant value.

The subtractor 13 subtracts the detected d-axis current Id from the command d-axis current Idr to obtain the d-axis current error ΔId. The PI calculator 14 executes PI calculation on the d-axis current error ΔId to generate a command d-axis voltage Vd. Similarly, the subtractor 15 subtracts the detected q-axis current Iq from the command q-axis current Iqr to obtain the q-axis current error ΔIq. The PI calculator 16 generates command q-axis voltage Vq by executing PI calculation on the q-axis current error ΔIq.

A rotational coordinate transformer 17 executes rotational coordinate transformation of the command d-axis voltage Vd and the command q-axis voltage Vq by using the rotor angle θest to output voltage Vα and voltage Vβ of the αβ coordinate system. A PWM generator 18 generates commutation signal modulated by PWM modulation based on the voltages Vα and Vβ. IGBT 4ap, 4an . . . constituting the inverter 4 execute switching operation according to the commutation signal applied through the drive circuit not shown. Thus, voltages corresponding to the voltages Vα and Vβ are applied on the coils 2a, 2b, and 2c of the motor 2 to rotationally drive the motor 2.

The rotational speed/rotational angle estimator 7 obtains rotational speed ωest and the rotor angle θest by using a motor model in the dq coordinate system. A d-axis induced voltage estimator 19 calculates a d-axis component estimate Ed of the induced voltage occurring at coils 2a, 2b, and 2c by the rotation of the rotor 2r by the following equation (1).

$$Ed = Vd - (R + pLd) \cdot Id + \omega est \cdot Lq \cdot Iq \quad (1)$$

In the above equation, R indicates coil resistance for one phase of the motor 2; Ld and Lq indicate d-axis and q-axis inductance for one phase of the motor 2; ωest indicates an estimate of rotational speed of the rotor 2r; and p is a differential operator. Also, currents Id and Iq employ the detected current values and d-axis voltage Vd employs command value instead of the detected value because of the high-responsiveness of the inverter 4.

As indicated in equations (2A) and (2B), the PI calculator 20 executes PI calculation on the d-axis component estimate Ed of induced voltage obtained from equation (1) to output a rotational speed error ωerr. Of note is that (n) and (n−1) indicate digital control period.

$$\omega err = Kp \cdot Ed(n) + Ed\_I(n) \quad (2A)$$

$$Ed\_I(n) = Ed\_I(n-1) + Ki \cdot Ed(n) \quad (2B)$$

As indicated in the equation (2c), the subtractor 21 obtains rotational speed ωest by subtracting the rotational speed error ωerr from the command rotational speed ωr.

$$\omega est = \omega r - \omega err \quad (2C)$$

According to this estimation method, the d-axis component estimate Ed of the induced voltage converges to zero. An integrator 22 integrates the rotational speed ωest as indicated in equation (2D) to output rotor angle θest.

$$\theta est = \theta est + Kt \cdot \omega est \quad (2D)$$

Figure 2:
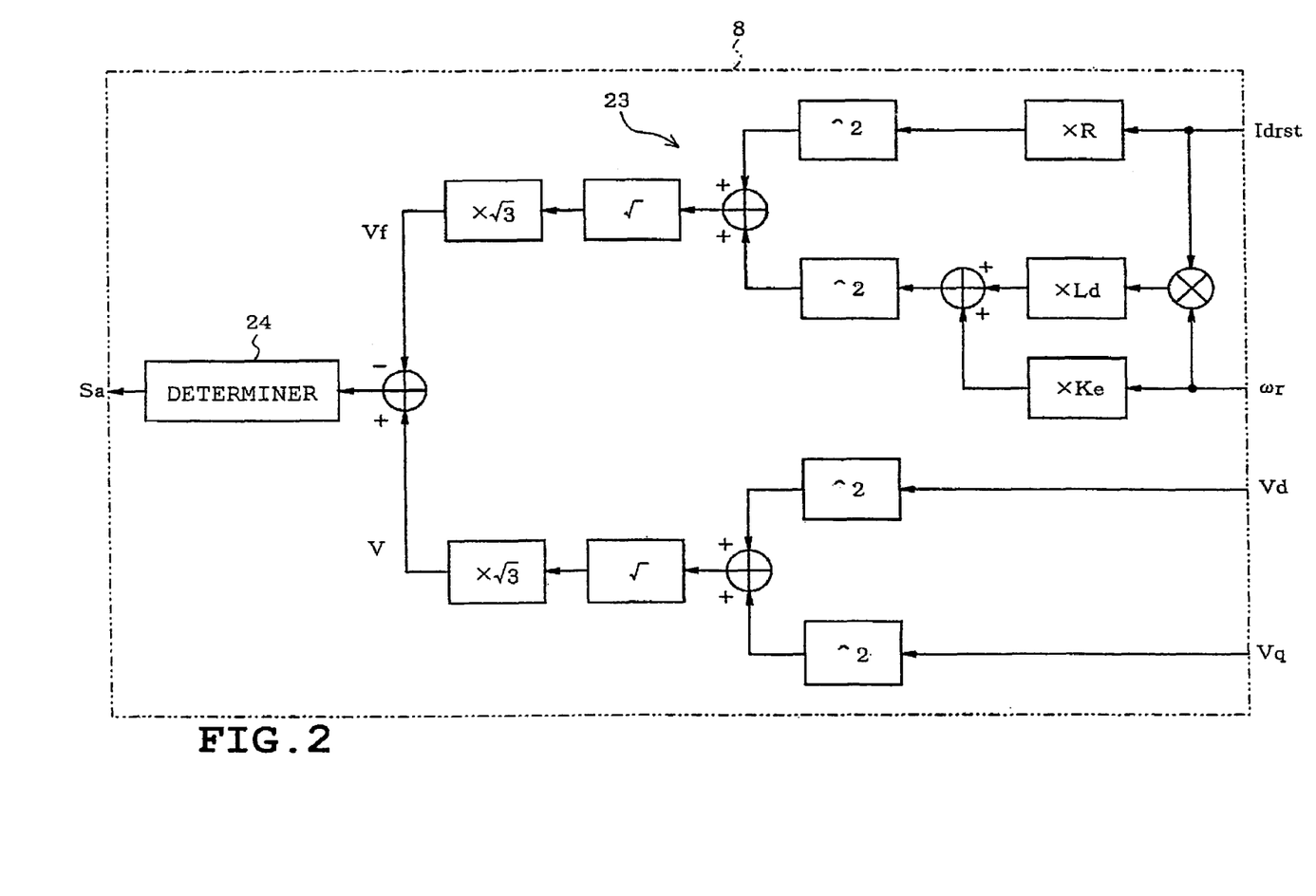
FIG. 2 is a block diagram illustrating a rotational abnormality detector during a start-up operation.

FIG. 2 indicates a configuration of the rotational abnormality detector 8 when executing the start-up operation. The rotational abnormality detector 8 is constituted by a voltage calculating portion 23 (voltage calculator), and a determining portion 24 (determiner). During the start-up operation, the voltage calculating portion 23 calculates theoretical voltage Vf of the motor 2 by applying parameters of the motor 2, the command rotational speed or and the currents Id and Iq to the voltage-current equation, whereas during the position estimating operation, the voltage calculating portion 23 calculates the voltage Vf by using the estimated rotational speed ωest instead of the command rotational speed ωr. The determiner 24 compares the theoretical voltage Vf, obtained with an assumption that the motor 2 is rotating normally, and the actual voltage of the motor 2 (replaced by command voltage V in the present embodiment), and determines occurrence of rotational error when the command voltage V is lower than the theoretical voltage Vf and sets a determining signal Sa at an H level.

The voltage-current equation employed in executing the start-up operation of the motor 2 is as indicated in the following equation (3).

$$\begin{bmatrix} Vd \\ Vq \end{bmatrix} = \begin{bmatrix} R & -\omega \cdot Lq \\ \omega \cdot Ld & R \end{bmatrix} \begin{bmatrix} Id \\ Iq \end{bmatrix} + \begin{bmatrix} 0 \\ Ke \cdot \omega \end{bmatrix} \quad (3)$$

In the above equation, Vd indicates d-axis voltage; Vq indicates q-axis voltage; R indicates a coil resistance for one phase of the motor 2; Ld and Lq indicate d-axis and q-axis inductance for one phase of the motor 2; Id indicates d-axis current; Iq indicates a q-axis current; and Ke indicates induced voltage constant, ω indicates rotational speed.

Also, the command voltage V replacing the actual voltage (voltage corresponding to inter-line voltage) of the motor 2 is as indicated in the following equation (4).

$$v = \sqrt{3} \times \sqrt{Vd^2 + Vq^2} \quad (4)$$

Next, detection of abnormal rotation of the motor 2 will be described with reference to FIG. 3.

The current controller 6 executes start-up operation on the motor 2 in stopped state, and the motor 2 is accelerated up to a rotational speed that allows the rotational speed/rotational angle estimator 7 to properly estimate the rotational speed ωest and the rotor angle θest. In this start-up operation, forcible commutation that increases the rotor angle θ according to the command rotational speed ωr is executed with the command d-axis current set at Idrst (constant value) and the command q-axis current Iqr at zero. At this time, since an open loop control is employed for the magnetic pole position of the rotor 2r, increased occurrence of abnormal rotation such as step out is observed depending upon the load.

During the start-up operation, the rotational abnormality detector 8 assigns command d-axis current Idrst in d-axis current Id, zero in q-axis current Iq, and command rotational speed ωr in rotational speed ω of the voltage-current equation of (3) to calculate the theoretical d-axis voltage Vd and q-axis voltage Vq of the motor 2. Then, theoretical voltage Vf (corresponding to inter-line voltage) of the motor 2 based on the voltage-current equation is calculated as indicated in the following equation (5). Of note is that in equation (3), the derivative term of the d-axis current Id and the derivative term of the q-axis current Iq are set at zero.

$$Vf = \sqrt{3} \times \sqrt{(Idrst \cdot R)^2 + (\omega r \cdot Ld \cdot Idrst + Ke \cdot \omega r)^2} \quad (5)$$

Figure 3A:
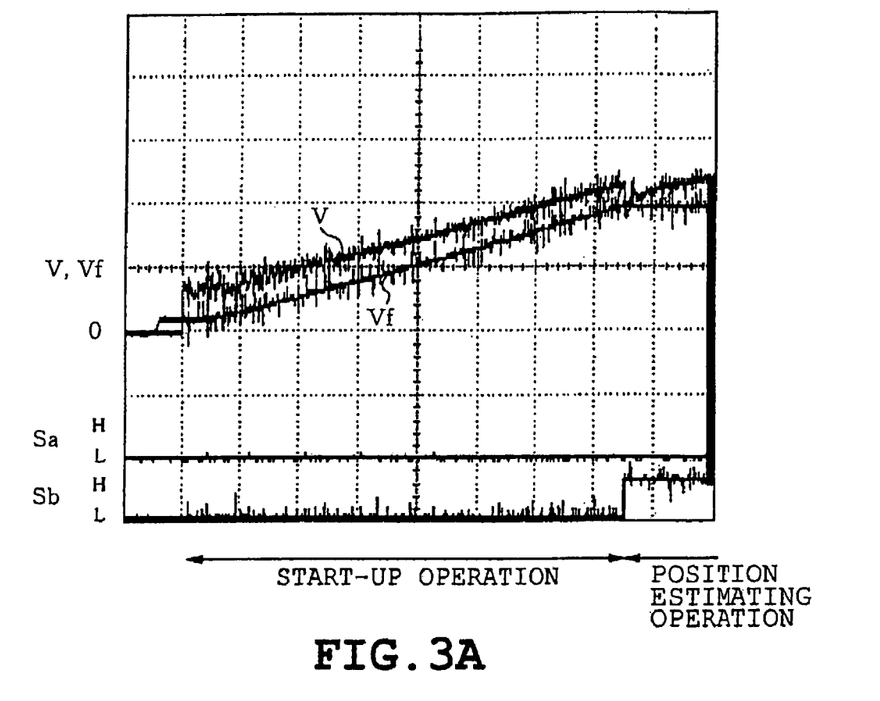
FIG. 3A is a waveform chart illustrating actual measured waveforms in normal acceleration when executing the start-up operation.
Figure 3B:
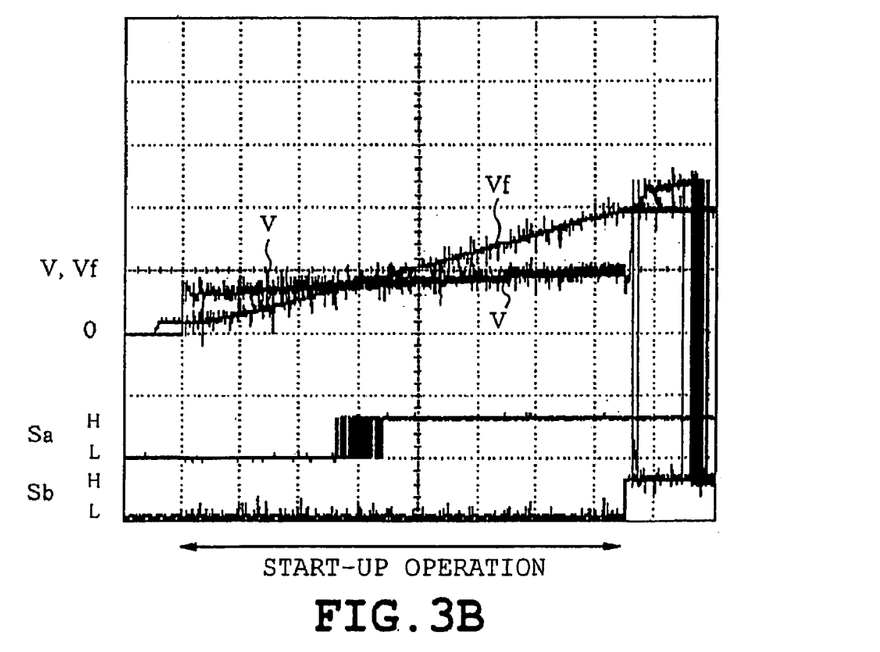
FIG. 3B is a waveform chart illustrating actual measured waveforms unaccelerated due to step-out.

FIGS. 3A and 3B indicate the measured waveforms during the start-up operation. FIG. 3A indicates a waveform in normal acceleration, and FIG. 3B indicates a waveform in case no acceleration takes place due to step out. Each figure represents the command voltage V of the motor 2, the theoretical voltage Vf, the determining signal Sa outputted by the determiner, and a switch signal Sb delivered from the start-up operation to the position estimating operation. The determining signal Sa is at level L when in normal rotation, and at level H when in abnormal rotation. The switch signal Sb is at level L when in the start-up operation and at level H when in the position estimating operation. For testing purposes, the start-up operation is continued even when the determining signal Sa is at level H in FIG. 3B; however, in practice, in case the determining signal Sa is at level H continuously for a predetermined time or more, the operation is stopped due to rotational abnormality.

The determiner 24 compares the command voltage V (corresponding to actual voltage) of the motor 2 indicated in equation (4) and the theoretical voltage Vf indicated in equation (5). When the motor 2 is in rotation, since the reactance of the coils 2a, 2b, and 2c are increased, voltage of the motor 2 is also increased in proportion to the increase in the command rotational speed ωr of the motor 2. In FIG. 3A, the command voltage V is increased in accordance with the increase in command rotational speed ωr as was the case in theoretical voltage Vf, and the command voltage V becomes constantly higher than the theoretical voltage Vf during the start-up operation. As a result, the determining signal Sa is constantly at level L.

As opposed to this, when the motor 2 is stopped or decelerated below the command rotational speed ωr, the reactance of the coils 2a, 2b, and 2c are reduced, and the voltage of the motor 2 stays low even if the command rotational speed ωr is increased. In FIG. 3B, the command voltage V is substantially constant, and the command voltage V becomes lower than the theoretical voltage Vf during the start-up operation. As a result, the determining signal Sa is changed from L level to H level.

Thus, the determiner 24 promptly detects occurrence of rotational abnormalities by comparing the command voltage V (corresponds to actual voltage) of the motor 2 with the theoretical voltage Vf during the start-up operation. Rotational abnormalities can likewise be detected during the position estimating operation. That is, when the load is constant, the voltage-current equation indicated in (3) stands approximately. Thus, the command d-axis current Idr is assigned to the d-axis current Id, the command q-axis current Iqr to the q-axis current Iq, and the rotational speed ωest estimated by the rotational speed/rotational angle estimator 7 is assigned to the rotational speed ω to calculate the theoretical d-axis voltage Vd and the q-axis voltage Vq of the motor 2. Then, the theoretical voltage Vf (voltage corresponding to inter-line voltage) of the motor 2 based on the voltage-current equation is calculated as indicated in the equation (6). The determiner 24 determines the occurrence of rotational abnormality and arranges the determining signal Sa at H level when the command voltage V becomes lower than the theoretical voltage Vf during the position estimating operation.

$$Vf = \sqrt{3} \times \sqrt{(R \cdot Idr - \omega est \cdot Lq \cdot Iqr)^2 + (\omega est \cdot Ld \cdot Idr + R \cdot Iqr + Ke \cdot \omega est)^2} \quad (6)$$

In case of load variation, the voltage-current equation indicated in equation (7) which is indicated in FIG. 5 may be used instead of the voltage-current equation indicated in equation (3).

$$\begin{bmatrix} Vd \\ Vq \end{bmatrix} = \begin{bmatrix} R + pLd & -\omega \cdot Lq \\ \omega \cdot Ld & R + pLq \end{bmatrix} \begin{bmatrix} Id \\ Iq \end{bmatrix} + \begin{bmatrix} 0 \\ Ke \cdot \omega \end{bmatrix} \quad (7)$$

In this rotational abnormality detection method, since the theoretical voltage Vf is calculated by using the motor parameter, there was a concern that any error in the parameters may lead to erroneous determinations. Thus, the impact of errors in the parameters during the start-up operation was examined by MonteCarlo simulation. As a result, it has been verified that rotational abnormalities caused by step-out can be almost constantly detected despite errors such as error between the estimated rotor angle θest and the actual rotor angle, voltage•current detection error, induced voltage (induced voltage constant Ke) error, error in coil inductance Ld and Lq, and error in coil resistance R, occurring on the order of magnitude that may occur in the actual system.

Also, in order to start the motor 2 more reliably, a positioning operation may be executed that conducts direct current to a coil of a predetermined phase prior to the start-up operation. In such case, the d-axis voltage Vd and the d-axis current Id during the positioning operation may be measured so as to provide basis for obtaining coil resistance R, which obtained resistance may be used as a motor parameter. This allows reduction of calculation errors of voltage Vf caused by variation in coil temperature. It has been verified that by the above simulation also, that reduction in coil resistance R error allows reliable detection of rotational abnormalities by step-out.

As described above, the motor control unit 1 of the present embodiment is provided with a rotational abnormality detector 8 that determines occurrence of rotational abnormalities in case the actual voltage of the motor 2 is lower than the theoretical voltage Vf by calculating the theoretical voltage Vf when the motor 2 is in normal rotation by applying the motor parameter, the command rotational speed ωr, and the currents Id and Iq of the motor 2 to the voltage-current equation of the motor 2. The rotational abnormality detector 8 allows detection of rotational abnormalities of the motor 2 even during the position estimating operation by using the rotational speed ωest estimated by the rotational speed/rotational angle estimator 7 instead of the command rotational speed ωr. Thus, locking caused by sudden change in load and reduction in rotation count caused by step-out can be detected promptly during sensor-less drive involving the start-up operation.

Since defect in the start-up operation can be detected at an early stage, consumption of unnecessary electricity can be restrained during the start-up operation, as well as preventing occurrence of noise. Also, since rotational abnormalities can be detected almost constantly even if errors of some magnitude exist in the motor parameters, the user need not make adjustments for detecting defects in the start-up operation after setting the motor parameters.

The voltage applied to the motor 2 has outstanding following capability to command voltage. Thus, the command voltage V may be employed for comparison with the theoretical voltage Vf instead of the actual voltage, which in turn unnecessitates the voltage detector.

The rotation abnormality detector 8 calculates the theoretical voltage Vf, by employing command currents Idr, Idrst, and Iqr as currents to be flown in the coils 2a, 2b, and 2c of the motor 2. Thus, the system is stabilized by being less susceptible to vibration. Also, during the start-up operation, since Idrst (constant value) is set to the command d-axis current and zero is set to the command q-axis current Iqr, derivative term pertaining to current in the voltage-current equation of the motor 2 can be omitted. As a result, the load on the processor can be reduced.

The present disclosure is not limited to the above described and illustrated embodiments but may be modified or expanded as follows.

In calculating the theoretical voltage Vf, a detected current Id may be employed as the d-axis current instead of the command current Idr, and the command current Idrst; and a detected current Iq may be employed as q-axis current instead of the command current Iqr.

The method of estimating the rotational speed ωest and the rotor angle θest is not limited to the method in which the d-axis component estimate Ed of the induced voltage is converged to zero by the rotational speed/rotational angle estimator 7.

A voltage detector may be provided so that the rotational abnormality detector 8 determines occurrence of rotational abnormalities by comparing the theoretical voltage Vf and the actual voltage detected by the voltage detector.

The foregoing description and drawings are merely illustrative of the principles of the present disclosure and are not to be construed in a limited sense. Various changes and modifications will become apparent to those of ordinary skill in the art. All such changes and modifications are seen to fall within the scope of the disclosure as defined by the appended claims.

What is claimed is:

1. A motor control unit, comprising:
a power converter unit that energize a motor based on a commutating signal, the motor having a rotor provided with a permanent magnet and a stator having a coil wound thereto;
a start-up controller that outputs a commutating signal to the power converter unit during a start-up operation, the commutating signal having a predetermined conductive pattern corresponding to a command rotational speed;
a voltage calculator that calculates a voltage of the motor during the start-up operation by applying a parameter for the motor, the command rotational speed, and a current flown in the coil of the motor to a voltage-current equation of the motor; and
a determiner that, during the start-up operation, compares a voltage calculated by the voltage calculator and an actual voltage of the motor and that determines occurrence of rotational abnormalities when the actual voltage is lower than the calculated voltage.

2. The motor control unit of claim 1, wherein the voltage calculator calculates a voltage of the motor by employing a command current as a current to be flown in the coil of the motor.

3. The motor control unit of claim 2, wherein the start-up controller executes positioning operation that energizes a coil of a predetermined phase of the motor prior to the start-up operation, and the voltage calculator obtains a resistance of the coil during the positioning operation and applies the resistance to a parameter of the motor to calculate a voltage of the motor.

4. The motor control unit of claim 3, wherein the determiner employs a command voltage of the motor as an actual voltage of the motor.

5. The motor control unit of claim 2, wherein the determiner employs a command voltage of the motor as an actual voltage of the motor.

6. The motor control unit of claim 1, wherein the start-up controller executes positioning operation that energizes a coil of a predetermined phase of the motor prior to the start-up operation, and the voltage calculator obtains a resistance of the coil during the positioning operation and applies the resistance to a parameter of the motor to calculate a voltage of the motor.

7. The motor control unit of claim 6, wherein the determiner employs a command voltage of the motor as an actual voltage of the motor.

8. The motor control unit of claim 1, wherein the determiner employs a command voltage of the motor as an actual voltage of the motor.

9. A motor control unit, comprising:
a power converter unit that energize a motor based on a commutating signal, the motor having a rotor provided with a permanent magnet and a stator having a coil wound thereto;
an estimator that estimates a rotational speed and a rotational position of the rotor;

a drive controller that outputs a commutating signal to the power converter unit during a position estimating operation based on a rotational position estimated by the estimator;

a voltage calculator that calculates a voltage of the motor during the position estimating operation by applying a parameter for the motor, a rotational speed estimated by the estimator, and a current flown in the coil of the motor to a voltage-current equation of the motor; and a determiner that, during the position estimating operation, compares a voltage calculated by the voltage calculator and an actual voltage of the motor and that determines occurrence of rotational abnormalities when the actual voltage is lower than the calculated voltage.

10. The motor control unit of claim 9, wherein the voltage calculator calculates a voltage of the motor by employing a command current as a current to be flown in the coil of the motor.

11. The motor control unit of claim 10, wherein the drive controller executes a positioning operation that energizes a coil of a predetermined phase prior to a start-up operation, and the voltage calculator obtains a resistance of the coil during the positioning operation and applies the resistance to a parameter of the motor to calculate a voltage of the motor.

12. The motor control unit of claim 11, wherein the determiner employs a command voltage of the motor as an actual voltage of the motor.

13. The motor control unit of claim 10, wherein the determiner employs a command voltage of the motor as an actual voltage of the motor.

14. The motor control unit of claim 9, wherein the drive controller executes a positioning operation that energizes a coil of a predetermined phase prior to a start-up operation, and the voltage calculator obtains a resistance of the coil during the positioning operation and applies the resistance to a parameter of the motor to calculate a voltage of the motor.

15. The motor control unit of claim 14, wherein the determiner employs a command voltage of the motor as an actual voltage of the motor.

16. The motor control unit of claim 9, wherein the determiner employs a command voltage of the motor as an actual voltage of the motor.

* * * * *